Patented Oct. 7, 1941

2,258,301

UNITED STATES PATENT OFFICE 2,258,301

LUBRICANT FOR THE LUBRICATION OF BALL BEARINGS AND SIMILAR ANTIFRICTION BEARINGS

Arnold J. Morway, Roselle, and Alan Beerbower, Elizabeth, N. J., assignors to Standard Oil Development Company, a corporation of Delaware No Drawing. Application May 11, 1938, Serial No. 207,307

9 Claims. (Cl. 252—42)

The present invention relates to improved lubricants, especially to greases which serve for the lubrication of ball bearings and similar antifriction bearings. The composition will be fully understood from the following description.

It is generally considered impossible to make neutral anhydrous soda greases from fatty acids alone, in the absence of glycerine or similar substances, and such compounds as have been produced in this way have been crumbly, sweat oil and break down into soft granular masses which have little or no lubricating value. Soda greases are ordinarily made from fats containing glycerine and are of longer fiber and while they may have a fairly good structure, they lack adherence and tend to be thrown off the bearing surface in use. It has been found that an excellent tenacious anhydrous soda grease of a remarkably smooth texture can be made from fatty acids by the inclusion of a relatively small amount of a byproduct of the low temperature liquid phase atmospheric pressure catalytic oxidation of paraffin wax.

Paraffin wax can be oxidized by blowing the melted wax with air at a temperature from 100 to 150° C., preferably in the presence of catalysts such as barium and manganese soaps. Besides the acids and alcohols, other materials are produced. The principal products are acids which are of the molecular weight range found in fatty oils, that is to say the acids, alcohol and the like are in the range from 10 to 15 carbon atoms. These acids are first separated by saponifying the crude oxidation product with aqueous soda, preferably under pressure, say 100 lbs. per sq. inch. An emulsion or mixture is formed but this can be avoided by addition of alcohol and the mixture is then extracted with naphtha or kerosene to separate unoxidized wax from oxidized and saponified materials, after which the soap solution is reacidified so as to release the fatty acids and organic impurities which collect as a layer above the aqueous solution. It is usually desirable to remove the alcohol by distillation before acidification. The organic layer containing acid and other oxidation products, is distilled under vacuum to remove such materials as are distillable and to recover a residue which, while its nature is not fully understood, appears to be a mixture of acids of very heavy molecular weight, esters, lactones and the like. A partial analysis and description of this material is as follows:

|  | Percent |
|---|---|
| Free acids, about | 30 |
| Esters, lactones, etc. | 65 |
| Unsaponifiable, about | 5 |

The total mixture has a neutralization value of about 46 mg. KOH per gram. The saponification value when the mixture is refluxed with KOH is about 175 mg. KOH per gram, and when carried out under pressure the value is about 230 mg. KOH per gram. It will be seen that this material is very different from an ordinary fat or wax.

The free acid content of the material when roughly separated, for example by solution in alcoholic caustic soda, has the following characteristics:

| Iodine value | mg. per gram | 99 |
|---|---|---|
| Neutralization value | mg. KOH per gram | 85.5 |
| Saponification value (reflux) in KOH | mg. per gram | 186.9 |
| Saponification value (pressure) | do | 220.5 |

The average molecular weight of this acidic material is about 626.5 which is, of course, much higher than most of the known fatty acids. The material remaining after removal of free acid has the following characteristics.

| Iodine value | mg. per gram | 82 |
|---|---|---|
| Saponification value (pressure) | mg. per gram | 115.7 |
| Naphtha soluble | percent | 97.5 |
| Naphtha insoluble | do | 2.5 |
| Saponifiable | do | 92.2 |
| Unsaponifiable | do | 8.6 |

From the above analyses it would appear that the material consists of very high molecular weight acids, which are highly unsaturated, together with unsaturated esters and other saponifiable material. The material is polymerized to a molecular weight greater than that of the wax from which it was produced. It is noted that this material is free of any aldehyde or aldehyde like compounds, and is very different from the lower molecular weight distillable ingredients which do not have the marked plasticizing value characteristic of this product.

This material as will be seen from the above analyses contains a large amount of heavy high boiling unsaturated acid. This is removed by extraction with alcoholic caustic soda so that the remaining material is substantially neutral. If desired, the neutral unsaturated saponifiable material may be separated by other means, for example, by first neutralizing the crude oxidation product with dilute aqueous caustic soda and then reextracting the unoxidized material with naphtha or other suitable organic solvent and removing distillable materials as before. In this way, substantially the same neutral material is collected which has a saponification value of 160 to 170 mg. of KOH per gram.

In making the present greases, fatty acid and the high molecular weight, non-distillable neutral oxidation product described above are mixed, using from 10 to 25 parts of the fatty acid to 1 to 5 parts of the oxidation product, depending on the particular qualities desired in the grease. To this mixture is then added from 30 to 50 parts of mineral lubricating oil and the whole is heated to about 150° F. Aqueous caustic soda is now added in an amount calculated to be sufficient to saponify only the fatty acid and the reaction is brought about by heating to 250° F. while stirring vigorously. More mineral oil is now added, for example from 40 to 50 parts, and the temperature is raised to 400 to 450° F., while continuing to stir in order to bring the material into complete homogeneity and to decrease the water content below about 1%.

The grease may be withdrawn and cooled at this point, if desired, but it is usually desired to allow it to cool in the kettle to about 150° F. and then work it at that temperature until it becomes smooth and transparent.

As an example of the manufacture of this grease, 14 parts of stearic acid were mixed with 27.6 parts of mineral lubricating oil which had a viscosity of 45–50 seconds Saybolt at 210° F. To this mixture one part of the neutral undistillable high molecular weight by-product of wax oxidation, which has been described heretofore, was now added and the mixture was charged to an open kettle. The temperature was raised to 140° F., and 2.1 parts of caustic soda were added. The caustic soda was added as a 40% aqueous solution, but the amount was calculated on the dry basis. The temperature was then raised to 250° F. and 55.3 parts of the additional mineral oil were added and the temperature was then raised further to 425° F. Stirring was continued at this temperature until the mixture was fluid and homogeneous.

It was then allowed to cool slowly to 140° F., without stirring and at that temperature agitation was begun and continued until the grease became more smooth and transparent and the withdrawn sample showed a penetration of about 250 at 77° F.

The present invention is not limited to any theory or function of the various ingredients, but only to the following claims in which it is desired to claim all novelty inherent in the invention.

We claim:

1. An anhydrous grease comprising a soda soap of a fatty acid, lubricating oil and a small amount of plasticizing agent consisting of non-distillable substantially neutral saponifiable material obtainable as a by-product of the oxidation of paraffin wax with removal of products which can be volatized without decomposition and acidic products, the amount of said neutral by-product being substantially less than half of the amount of acid used in making the soap.

2. An anhydrous grease composition comprising a soda soap of a fatty acid, a lubricating oil and a small amount of a plasticizing agent consisting of a substantially non-distillable neutral saponifiable by-product of wax oxidation derived from the crude wax oxidation product by separating distillable materials which can be volatilized without decomposition, neutralizing the undistillable acids and separating the same so as to recover the neutral saponifiable material, the amount of said neutral by-product being substantially less than half of the amount of acid used in making the soap.

3. Product according to claim 2, comprising 10 to 25 parts of fatty acid soap, 70 to 100 parts of lubricating oil and 1 to 5 parts of a neutral, non-distillable by-product of wax oxidation.

4. Product according to claim 2, comprising 14 parts of stearic acid soap, 75 to 85 parts of mineral lubricating oil and one part of the said non-distillable, substantially neutral by-product of wax oxidation, the grease being smooth and homogeneous and having a preferred penetration range of from 240 to 300 at 77° F.

5. A glycerine-free oil-soap grease, the soap content of which consists only of a sodium soap made by treating a saturated fatty acid with caustic soda, the oil being a mineral oil, and the only plasticizing agent present being a non-distillable substantially neutral, saponifiable material derived from the low-temperature, liquid-phase, atmospheric-pressure, catalytic oxidation of paraffin wax, said material being substantially free from unconverted wax, acids, aldehydes and soaps, and consisting essentially of a mixture of esters, lactones, and the like, having approximately the following characteristics:

Iodine value _____ mg. per gram __ 82.
Saponification value
 (under pressure) _____ mg. KOH/gram __ 115.7
Naphtha soluble _____ percent __ 97.5
Saponifiable _____ _____ do ____ 92.2 the amount of said non-distillable neutral material being substantially less than half of the amount of acid used in making the soap, and said grease being tenacious and having a smooth texture.

6. A grease according to claim 5 in which the soap is made from stearic acid.

7. A grease according to claim 5 having a penetration of about 250 at 77° F.

8. The process of making greases which consists essentially in mixing with 10 to 25 parts of fatty acid about 1 to 5 parts of substantially non-distillable, saponifiable wax-oxidation residue from which the free acids have been removed, adding 30 to 50 parts of mineral lubricating oil, heating the mixture to about 150° F., adding enough aqueous caustic soda to saponify only the fatty acid, heating the mixture to 250° F. with stirring until reaction has occurred, adding 40 to 50 parts more of mineral oil, and heating to 400 to 450° F. with stirring until the water content is decreased below about 1%.

9. Process according to claim 8 followed by cooling the mass slowly without stirring to about 140° F., and then agitating.

ARNOLD J. MORWAY.
ALAN BEERBOWER.